United States Patent
Ma et al.

(10) Patent No.: US 11,843,107 B2
(45) Date of Patent: *Dec. 12, 2023

(54) ION CONDUCTOR, AND POSITIVE ELECTRODE, SOLID ELECTROLYTE, AND LITHIUM BATTERY EACH INCLUDING THE ION CONDUCTOR, AND METHOD OF PREPARING THE ION CONDUCTOR

(71) Applicant: Samsung Electronics Co., Ltd., Suwon-si (KR)

(72) Inventors: Sangbok Ma, Suwon-si (KR); Donghwa Seo, Burlington, MA (US)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/152,213

(22) Filed: Jan. 10, 2023

(65) Prior Publication Data
US 2023/0142448 A1    May 11, 2023

Related U.S. Application Data (63) Continuation of application No. 16/876,605, filed on May 18, 2020.
(Continued)

(30) Foreign Application Priority Data
Dec. 5, 2019    (KR) .................. 10-2019-0160966

(51) Int. Cl.
*H01M 4/131* (2010.01)
*H01M 4/505* (2010.01)
(Continued)

(52) U.S. Cl.
CPC ......... *H01M 4/131* (2013.01); *H01M 4/0471* (2013.01); *H01M 4/1391* (2013.01);
(Continued)

(58) Field of Classification Search
None
See application file for complete search history.

(56) References Cited

U.S. PATENT DOCUMENTS

2014/0120378 A1* 5/2014 Mun ............... H01M 4/139
        429/231.95
2015/0024273 A1* 1/2015 Yamazaki ........... C01G 53/50
        427/126.3
(Continued)

FOREIGN PATENT DOCUMENTS

CN    108682882 A    10/2018

OTHER PUBLICATIONS

E.E.Hellstrom et al., "Li ion conduction in Li2ZrO3, Li4ZrO4, and LiScO2," Solid State Ionics, 1981, pp. 59-64, vol. 2, Issue 1.

*Primary Examiner* — Christopher P Domone
(74) *Attorney, Agent, or Firm* — CANTOR COLBURN LLP (57) ABSTRACT

A lithium battery includes: a positive electrode having a positive active material; a negative electrode including lithium metal; and a solid electrolyte disposed therebetween. The solid electrolyte contains at least one oxide represented by $Li_{4\pm x}M_{1-x}M'_xO_4$ (Formula 1), $Li_{4-y}M''O_{4-y}A'_y$ (Formula 2), or $Li_{4+4z}M'''_{1-z}O_4$ (Formula 3), wherein and $0\leq x\leq 1$ and $0\leq x'\leq 1$, M is a Group 4 element, and M' is an element of Group 2, 3, 5, 12, or 13, a vacancy, or a combination thereof, with the proviso that when M is Zr, then $x\neq 0$, $x'\neq 0$ and M' is Be, Ca, Sr, Ba, Ra, Cd, Hg, Cn, Ga, In, Tl, an element of Group 3 or 5, or a combination thereof; $0\leq y\leq 1$, M" is a Group 4 element, and A' includes at least one halogen, with (Continued)

the proviso that when M″ is Zr, then y≠0; and 0<z<1, and M‴ is a Group 4 element.

17 Claims, 5 Drawing Sheets

Related U.S. Application Data (60) Provisional application No. 62/942,506, filed on Dec. 2, 2019.

(51) Int. Cl.
    *H01M 4/525*     (2010.01)
    *H01M 4/36*     (2006.01)
    *H01M 4/04*     (2006.01)
    *H01M 10/0525*     (2010.01)
    *H01M 10/0562*     (2010.01)
    *H01M 4/1391*     (2010.01)
    *H01M 4/02*     (2006.01)

(52) U.S. Cl.
    CPC ........... *H01M 4/364* (2013.01); *H01M 4/366* (2013.01); *H01M 4/505* (2013.01); *H01M 4/525* (2013.01); *H01M 10/0525* (2013.01); *H01M 10/0562* (2013.01); *H01M 2004/027* (2013.01); *H01M 2004/028* (2013.01)

(56) References Cited

U.S. PATENT DOCUMENTS

2019/0097267 A1*   3/2019   Yokoyama ............... H01B 1/08
2020/0350587 A1*  11/2020   Takenouchi ........ H01M 4/1399

\* cited by examiner

ION CONDUCTOR, AND POSITIVE ELECTRODE, SOLID ELECTROLYTE, AND LITHIUM BATTERY EACH INCLUDING THE ION CONDUCTOR, AND METHOD OF PREPARING THE ION CONDUCTOR

CROSS-REFERENCE TO RELATED APPLICATIONS

This application is a continuation of U.S. application Ser. No. 16/876,605, filed on May 18, 2020, which claims priority to and the benefit of U.S. Provisional Patent Application No. 62/942,506, filed on Dec. 2, 2019, in the United States Patent and Trademark Office, and Korean Patent Application No. 10-2019-0160966, filed on Dec. 5, 2019, in the Korean Intellectual Property Office, and all the benefits accruing therefrom under 35 U.S.C. § 119, the contents of all of which are incorporated herein in their entirety by reference.

BACKGROUND

1. Field

The present disclosure relates to an ion conductor, and a positive electrode, a solid electrolyte, and a lithium battery, each including the ion conductor, and methods of preparing the ion conductor.

2. Description of Related Art

Lithium batteries are generally manufactured using lithium intercalation materials as a negative electrode and a positive electrode, arranging a porous separator between the electrodes, and injecting a liquid electrolyte into the battery.

The liquid electrolyte serves as an ion conductor. In a lithium metal battery, there is a risk of fire or explosion due to the high reactivity between the lithium metal, which can be formed in a thin film, and a liquid electrolyte during charge and discharge.

Therefore, there is a need to develop improved battery materials having improved safety.

SUMMARY

Provided is an ion conductor having excellent ionic conductivity at a high temperature (about 60° C.).

Provided is a positive electrode including the ion conductor.

Provided is a solid electrolyte including the ion conductor.

Provided is a lithium battery including the ion conductor.

Provided is a method of preparing the ion conductor.

Additional aspects will be set forth in part in the description which follows and, in part, will be apparent from the description, or may result from the presented embodiments without undue experimentation.

According to an aspect, an ion conductor includes at least one oxide represented by Formulae 1 to 3:

$$Li_{4\pm x}M_{1-x'}M'_{x'}O_4 \qquad \text{Formula 1}$$

wherein in Formula 1,
0≤x≤1 and 0≤x'≤1,
M is a Group 4 element, and
M' is an element of Group 2, an element of Group 3, an element of Group 5, an element of Group 12, an element of Group 13, a vacancy, or a combination thereof,
with the proviso that when M is Zr, then x≠0, x'≠0, and M' is Be, Ca, Sr, Ba, Ra, Cd, Hg, Cn, Ga, In, Tl, an element of Group 3, an element of Group 5, or a combination thereof;

$$Li_{4-y}M''O_{4-y}A'_y \qquad \text{Formula 2}$$

wherein in Formula 2,
0≤y≤1,
M'' is a Group 4 element, and
A' may include at least one halogen,
with the proviso that when M'' is Zr, then y≠0;

$$Li_{4+4z}M'''_{1-z}O_4 \qquad \text{Formula 3}$$

wherein in Formula 3,
0<z<1, and
M''' is a Group 4 element.

According to an aspect, a positive electrode includes the ion conductor.

According to an aspect, solid electrolyte includes the ion conductor.

According to an aspect, a lithium battery includes:
a positive electrode layer including a positive active material layer;
a negative electrode layer including lithium metal; and
the solid electrolyte layer disposed between the positive electrode layer and the negative electrode layer.

According to an aspect, a method of preparing the ion conductor includes:
providing a precursor of the ion conductor to prepare a precursor mixture;
pulverizing the precursor mixture;
heat-treating the precursor mixture in an oxidizing atmosphere to prepare a first heat-treatment product;
pulverizing the first heat-treatment product to prepare a pellet; and
heat-treating the pellet in an oxidizing atmosphere, a reducing atmosphere, or a combination thereof.

BRIEF DESCRIPTION OF THE DRAWINGS

The above and other aspects, features, and advantages will be more apparent from the following description taken in conjunction with the accompanying drawings, in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects.

Hereinafter, an ion conductor, and positive electrode, solid electrolyte, and lithium battery each including the ion conductor, and a method of preparing the ion conductor according to an embodiment of the present disclosure will be described in detail with reference to the accompanying drawings. The following description of various embodiments of the present disclosure is provided for illustration purposes only and not for the purpose of limiting the present disclosure as defined by the appended claims.

Expressions such as "at least one of" or "one or more," when preceding a list of elements, modify the entire list of elements and do not modify the individual elements of the list. As used herein, the term "combination" includes a mixture, an alloy, a reaction product, and the like unless otherwise stated.

Throughout the specification, the term "include" in relation to an element does not preclude other elements but may further include another element, unless otherwise stated. As used herein, terms "first," "second," and the like are used to distinguish one component from another, without indicating order, quantity, or importance. An expression used in the singular encompasses the expression of the plural, unless otherwise indicated or it has a clearly different meaning in the context. The term "or" refers to "and/or" unless otherwise stated. As used herein, the term "and/or" includes any and all combinations of one or more of the associated listed items. As used herein, the terms "an embodiment," "embodiments," and the like indicate that elements described with regard to an embodiment are included in at least one embodiment described in this specification and may or may not present in other embodiments. In addition, it may be understood that the described elements are combined in any suitable manner in various embodiments.

Unless otherwise defined, technical and scientific terms used herein have the same meaning as commonly understood by one of ordinary skill in the art to which this application belongs. All patents, patent applications, and other cited references are incorporated herein by reference in their entirety. However, in the event of any conflict or inconsistency between terms used herein and terms of the cited references, the terms used in this specification take precedence over the terms of the cited references. While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications, variations, improvements, and substantial equivalents.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, "a," "an," "the," and "at least one" do not denote a limitation of quantity and are intended to include both the singular and plural, unless the context clearly indicates otherwise. For example, "an element" has the same meaning as "at least one element," unless the context clearly indicates otherwise. "At least one" is not to be construed as limiting "a" or "an." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one elements relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

$Li_4ZrO_4$ is electrochemically stable in contact with lithium metal. However, $Li_4ZrO_4$ has a very low ionic conductivity.

Disclosed is an ion conductor, a positive electrode, a solid electrolyte, and a lithium battery each including the ion conductor, and a method of preparing the ion conductor, which have improved ionic conductivity.

Hereinafter, the ion conductor, and the positive electrode, the solid electrolyte, and the lithium battery, each including the ion conductor, and the method of preparing the ion conductor will be described in further detail.

Ion Conductor

An ion conductor according to an embodiment comprises at least one oxide represented by Formulae 1 to 3.

$$Li_{4\pm x}M_{1-x}M'_xO_4 \quad \text{Formula 1}$$

In Formula 1,
0≤x≤1 and 0≤x'≤1,
M is a Group 4 element, and
M' is an element of Group 2, an element of Group 3, an element of Group 5, an element of Group 12, an element of Group 13, a vacancy, or a combination thereof,
with the proviso that when M is Zr, then x≠0, x'≠0, and M' is Be, Ca, Sr, Ba, Ra, Cd, Hg, Cn, Ga, In, Tl, an element of Group 3, an element of Group 5, or a combination thereof;

$$Li_{4-y}M''O_{4-y}A'_y \quad \text{Formula 2}$$

In Formula 2,
0≤y≤1,
M'' is a Group 4 element,
A' is a halogen, and
when M'' is Zr, y≠0;

$$Li_{4+4z}M'''_{1-z}O_4 \quad \text{Formula 3}$$

In Formula 3,
0<z<1, and
M''' is a Group 4 element.

The ion conductor may be electrically neutral. In addition, the ion conductor may have a selected amount of lithium in a crystal structure thereof, thereby improving ion conductivity. The lithium ion conductor may provide a pathway for lithium ions in an electrochemical device.

The relationship between the ion conductor and an activation energy barrier may be understood by Equation 1.

$$\sigma(Li^+) = \left(\frac{C_{\textit{eff}}}{kT}\right)(D_0 e^{-E_b/kT}) \quad \text{Equation 1}$$

In Equation 1, $\sigma(Li^+)$ is Li ion conductivity, $C_{\textit{eff}}$ is the effective concentration, k is the Boltzmann constant, T is the temperature, e.g., in kelvin, $D_0$ is the diffusivity, and $E_b$ is the activation energy barrier.

As shown by Equation 1, an element having a lower activation energy barrier has a higher ionic conductivity. The oxides represented by Formulae 1 to 3 include at least one Group 4 element having a high oxidation voltage, excellent electrochemical stability, and may have a lithium-rich or lithium-deficient composition. Also, the oxide represented by Formulae 1 to 3 may be doped with an element of Group 2, an element of Group 3, an element of Group 5, an element of Group 12, an element of Group 13, a vacancy, a halogen, or a combination thereof, in a predetermined amount. The oxide having such a composition may have an improved ionic conductivity by lowering an activation energy barrier for movement of lithium ions.

For example, the M, M'', and M''' may be Zr, Hf, or a combination thereof. While not wanting to be bound by theory, it is understood that when any of M, M'', or M''' is Hf, the oxide may have relatively high ionic conductivity because Hf has a lower activation energy barrier for movement of lithium ions than when any of M, M'', and M''' is Zr. For example, M' may be Y, Al, Ta, Mg, Zn, or a combination thereof. Also, the A' may be F, Cl, or a combination thereof. While not wanting to be bound by theory, it is understood that inclusion of a dopant A', e.g., F or Cl, may further improve ion conductivity.

In Formula 1, x and x' may be each independently from 0 to about 0.9, for example, from 0 to about 0.8, from 0 to about 0.7, from 0 to about 0.6, or from 0 to about 0.5, from about 0.1 to about 0.9, for example, from about 0.2 to about 0.8, or from about 0.3 to about 0.7. Also, y may be from 0 to about 0.9, for example, 0 to about 0.8, 0 to about 0.7, 0 to about 0.6, or 0 to about 0.5, for example, from about 0.2 to about 0.8, or from about 0.3 to about 0.7. Also, z may be from 0 to about 0.9, for example, 0 to about 0.8, 0 to about 0.7, 0 to about 0.6, or 0 to about 0.5, for example, from about 0.2 to about 0.8, or from about 0.3 to about 0.7.

For example, the ion conductor may include $Li_{4.2}Zr_{0.8}Y_{0.2}O_4$, $Li_{3.8}Zr_{0.8}Ta_{0.2}O_4$, $Li_{3.9}ZrF_{0.1}O_{3.9}$, $Li_{3.8}ZrF_{0.2}O_{3.8}$, $Li_{3.5}ZrF_{0.5}O_{3.5}$, $Li_{3.9}ZrCl_{0.1}O_{3.9}$, $Li_{3.8}ZrCl_{0.2}O_{3.8}$, $Li_{3.5}ZrCl_{0.5}O_{3.5}$, $Li_4HfO_4$, $Li_{4.2}Hf_{0.8}Y_{0.2}O_4$, $Li_{4.2}Hf_{0.8}Al_{0.2}O_4$, $Li_{3.8}Hf_{0.8}Ta_{0.2}O_4$, $Li_{4.2}Hf_{0.9}Mg_{0.1}O_4$, $Li_{4.2}Hf_{0.9}Zn_{0.1}O_4$, $Li_{3.9}HfF_{0.1}O_{3.9}$, $Li_{3.8}HfF_{0.2}O_{3.8}$, $Li_{3.5}HfF_{0.5}O_{3.5}$, $Li_{3.9}HfCl_{0.1}O_{3.9}$, $Li_{3.8}HfCl_{0.2}O_{3.8}$, $Li_{3.5}HfCl_{0.5}O_{0.5}$, $Li_{4.4}Zr_{0.9}O_4$, $Li_{4.4}Hf_{0.9}O_4$, or a combination thereof. For example, the ion conductor may include $Li_{4.4}Zr_{0.9}O_4$, $Li_{4.4}Hf_{0.9}O_4$, or a combination thereof.

The ion conductor may have an ionic conductivity of about 2×10$^{-7}$ milliSiemens per centimeter (mS/cm) or more, for example, about 3×10$^{-7}$ mS/cm or more, about 4×10$^{-7}$ mS/cm or more, about 4.1×10$^{-7}$ mS/cm or more, about 4.2×10$^{-7}$ mS/cm or more, about 4.3×10$^{-7}$ mS/cm or more, about 4.4×10$^{-7}$ mS/cm or more, or about 4.5×10$^{-7}$ mS/cm or more, at about 60° C. The ion conductor may have an ionic conductivity about 10 times or greater than the ionic conductivity of $Li_4ZrO_4$ at about 60° C. For example, the ion conductor may have an ionic conductivity from about 2×10$^{-7}$ to about 1×10$^{-5}$, from about 2×10$^{-7}$ to about 5×10$^{-6}$, or from about 2×10$^{-7}$ to about 2×10$^{-6}$.

The ion conductor may be a solid ion conductor.

Positive Electrode

A positive electrode according to an embodiment may include the ion conductor.

Figure 1:
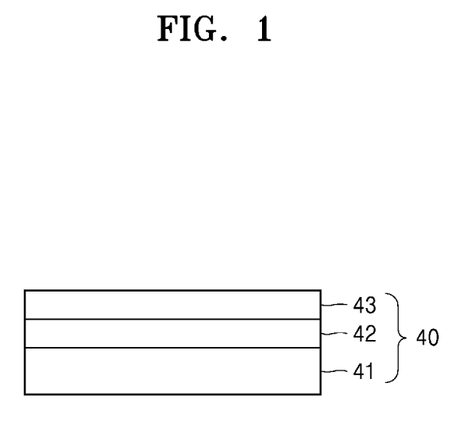
FIG. 1 is a schematic cross-sectional view of an embodiment of a positive electrode for a lithium battery.

FIG. 1 is a schematic cross-sectional view of a positive electrode for a lithium battery according to an embodiment.

As shown in FIG. 1, in a positive electrode 40 for a lithium battery, a positive current collector 41, a positive active material layer 42, and an ion conductor coating layer 43 comprising the ion conductor are sequentially arranged. The ion conductor coating layer 43 is located on a surface of the positive active material layer 42, e.g., as a separate layer. Because the ion conductor coating layer 43 has a high ionic conductivity, internal resistance of the positive electrode 40 including the ion conductor may be reduced relative to a positive electrode without the ion conductor coating layer. In addition, in an aspect wherein the ion conductor coating layer 43 is included in the positive electrode 40, the positive electrode 40 may have high ionic conductivity and excellent electrochemical stability, without additionally using a solid electrolyte within the positive electrode.

An amount of the ion conductor included in the positive electrode 40 may be, for example, from 0 weight percent (wt %) to about 10 wt % (excluding 0 wt %), from about 0.01 to about 10 wt %, or from about 0.1 to about 10 wt %, based on a total weight of the positive electrode 40. For example, the amount of ion conductor included in the positive electrode may be from about 0.01 wt % to about 9 wt %, or from about 0.01 wt % to about 8.5 wt %, or from about 0.01 wt % to about 8 wt %, based on a total weight of the positive electrode.

The positive current collector 41 may be in the form of a plate, a mesh, a fiber, or a foil, and may comprise indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or an alloy thereof. A combination comprising at least one of the foregoing may be used.

The positive current collector 41 may be omitted.

The positive active material may be any suitable compound that allows for intercalation and deintercalation of an alkali metal, e.g., lithium.

Examples of a suitable positive active material is a compound allowing for intercalation and deintercalation of lithium and may include a compound represented by the following formulae: $Li_aA'_{1-b}B'_bD'_2$ (where $0.90 \leq a \leq 1.8$ and $0 \leq b \leq 0.5$); $Li_aE_{1-b}B'_bO_{2-c}D'_c$ (where $0.90 \leq a \leq 1.8$, $0 \leq b \leq 0.5$, and $\leq c \leq 0.05$); $LiE_{2-b}B'_bO_{4-c}D'_c$ (where $0 \leq b \leq 0.5$ and $0 \leq c \leq 0.05$); $Li_aNi_{1-b-c}Co_bB'_cD'_\alpha$ (where $0.90 \leq a \leq 1.8$, $0 \leq b \leq 0.05$, $0 \leq c \leq 0.05$, and $0 < \alpha \leq 2$); $Li_aNi_{1-b-c}Co_bB'_cO_{2-\alpha}F'_\alpha$ (where $0.90 \leq a \leq 1.8$, $0 \leq b \leq 0.5$, $0 \leq c \leq 0.05$, and $0 < \alpha < 2$); $Li_aNi_{1-b-c}Mn_bB'_cD'$, (where $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (where $0.90 \leq a \leq 1.8$, $0 \leq b \leq 0.5$, $0 \leq c \leq 0.05$ and $0 < \alpha < 2$); $Li_aNi_bE_cG_dO_2$ (where $0.90 \leq a \leq 1.8$, $0 \leq b \leq 0.9$, $0 \leq c \leq 1.5$, and $0.001 \leq d \leq 0.1$); $Li_aNi_bCo_cMn_dG_eO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1.8$ and $0.001 \leq b \leq 0.1$); $Li_aCoG_bO_2$ (where $0.90 \leq a \leq 1.8$ and $0.001 \leq b \leq 0.1$); $Li_aMnG_bO_2$ (where $0.90 \leq a \leq 1.8$ and $0.001 \leq b \leq 0.1$); $Li_aMn_2G_bO_4$ (where $0.90 \leq a \leq 1.8$ and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); or $LiFePO_4$.

In the foregoing formulae for suitable positive active materials, A' is Ni, Co, Mn, or a combination thereof; B' is Al, Ni, Co, Mn, Cr, Fe, Mg, Sr, V, a rare earth element, or a combination thereof; D' is O, F, S, P, or a combination thereof; E is Co, Mn, or a combination thereof; F' is F, S, P, or a combination thereof; G is Al, Cr, Mn, Fe, Mg, La, Ce, Sr, V, or a combination thereof; Q is Ti, Mo, Mn, or a combination thereof; I' is Cr, V, Fe, Sc, Y, or a combination thereof; and J is V, Cr, Mn, Co, Ni, Cu, or a combination thereof. The rare earth element may be cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb), or yttrium (Y).

The positive active material may have a coating layer including a coating element in addition to the ion conductor on the surface thereof. Alternatively, a mixture of a compound without a coating layer and a compound having a coating layer may be used. The coating layer may include a compound such as an oxide, hydroxide, oxyhydroxide, oxycarbonate, or hydroxycarbonate of the coating element. The compound constituting the coating layer may be amorphous or crystalline. Examples of the coating element included in the coating layer may be Mg, Al, Co, K, Na, Ca, Si, Ti, V, Sn, Ge, Ga, B, As, Zr, or a combination thereof. Any suitable coating method, which does not adversely affect physical properties of the positive active material (e.g., spray coating or immersing), may be used to form the coating layer. Such methods are used in the art, and thus can be used in conjunction with the embodiments disclosed herein.

The positive active material may be, for example, a ternary lithium transition metal oxide having a layered rock-salt type structure such as $LiNi_xCo_yAl_zO_2$ (NCA) or $LiNi_xCo_yMn_zO_2$ (NCM) (where $0<x<1$, $0<y<1$, $0<z<1$, and $x+y+z=1$). The ternary lithium transition metal oxide having the layered rock-salt type structure may increase energy density and improve thermal stability of a battery that includes the positive electrode.

In addition, the positive active material may be a nickel-based composite oxide, such as lithium nickel cobalt manganese oxide or nickel cobalt aluminum oxide, comprising about 60 wt % or more of nickel, based on the total weight of positive active material.

The positive active material may also be a lithium cobalt oxide, which has a high true density and a high diffusion velocity of lithium ions, in addition to the nickel-based composite oxide. For example, the positive active material may be a composite positive active material prepared by coating the lithium cobalt oxide with a nickel-based composite oxide, $LiNbO_2$, $Li_4Ti_5O_{12}$, an aluminum oxide, or a combination thereof.

The positive active material may also be sulfur, a sulfur-based compound, a sulfur-carbon composite, a sulfur-metal oxide composite, a sulfur-carbon-metal oxide composite, or a combination thereof.

Also, the positive electrode may include oxygen as a positive active material.

The positive active material may be in the form of a particle having a spherical shape or an elliptical shape. Also, a particle size, e.g., particle diameter, of the positive active material is not particularly limited and may be within a suitable range for a positive active material of an all-solid lithium secondary battery. An amount of the positive active material of the positive electrode 40 is not particularly limited and may be within a range applicable to a positive electrode of a lithium battery. The particle size and amount can be determined by one of skill in the art without undue experimentation.

In addition, the positive electrode 40 may further include an additive such as a conductive agent, a binder, a filler, a dispersant, or an ion-conductive adjuvant, in addition to the positive active material.

The conductive agent added to the positive electrode 40 may be, for example, graphite, carbon black, acetylene black, Ketjen black, carbon fiber, or a metal powder. In addition, a binder may be included if desired. The binder added to the positive electrode 40 may be, for example, styrene butadiene rubber (SBR), polytetrafluoroethylene, polyvinylidene fluoride, or polyethylene. Coating agents, dispersants, and/or ion-conductive adjuvants may also be added to the positive electrode 40.

Solid Electrolyte and Lithium Battery

A solid electrolyte according to another embodiment may include the ion conductor.

A lithium battery according to another embodiment may include: a positive electrode layer including a positive active material layer; a negative electrode layer including lithium metal; and a solid electrolyte layer disposed between the positive electrode layer and the negative electrode layer. Because the solid electrolyte and the solid electrolyte layer of the lithium battery include the ion conductor, and the ion conductor has a high ionic conductivity, internal resistance of the solid electrolyte and the lithium battery including the ion conductor, may be reduced relative to when the ion conductor is not used.

Figure 2A:
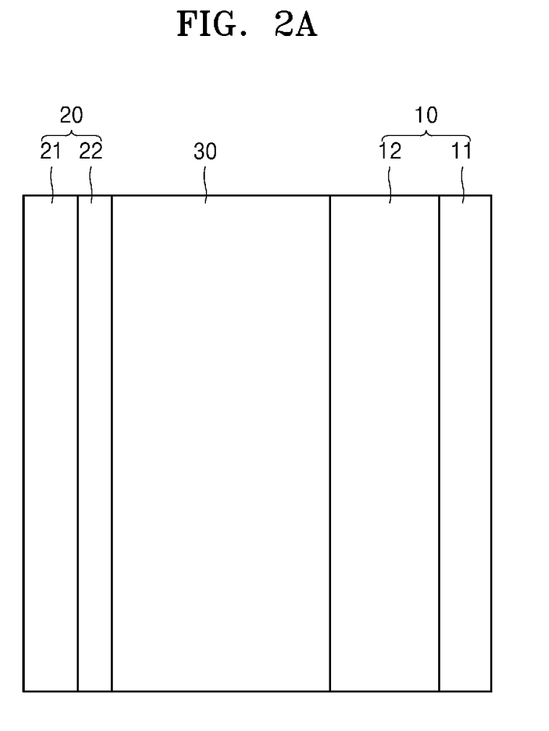
FIG. 2A is a schematic cross-sectional view of an embodiment of a lithium battery.

FIG. 2A is a schematic cross-sectional view of a lithium battery according to an embodiment.

As shown in FIG. 2A, the lithium battery includes: a positive electrode layer 10, including a positive active material layer 12 located on a positive current collector 11; a negative electrode layer 20, including lithium metal 22 on a negative current collector 21; and a solid electrolyte layer 30 disposed between the positive electrode layer 10 and the negative current collector 21.

Figure 2B:
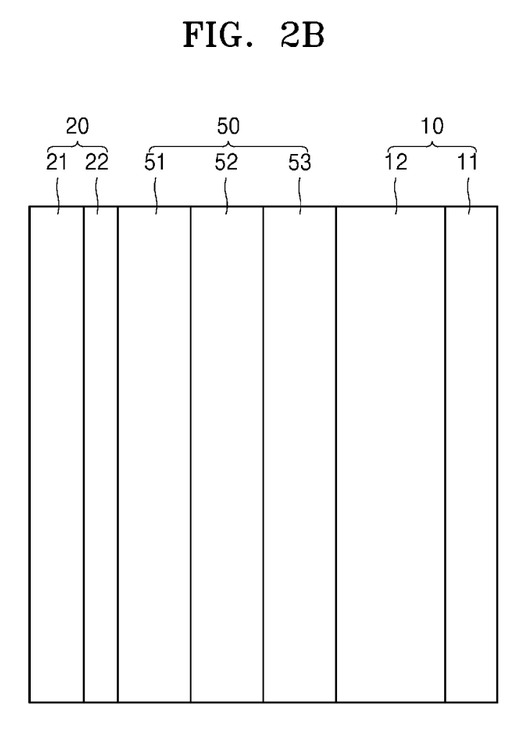
FIG. 2B is a schematic cross-sectional view of an embodiment of a lithium battery.

As shown in FIG. 2B, solid electrolyte layer 50 may include multiple layers 51, 52, 53, which may be the same or different, and may each independently comprise the ion conductor of Formula 1. The solid electrolyte 50 may include two or more, e.g., three or more, distinct solid electrolyte layers, that are disposed between the positive electrode layer 10 and the negative electrode layer 20.

The positive current collector 11, the positive active material layer 12, and the positive electrode layer 10 are as described herein, and thus further description thereof will not be repeated for clarity.

The negative current collector 21 may comprise a material that does not react with lithium metal, i.e., does not form an alloy or a compound with lithium metal. The material used to form the negative current collector 21 may be, for example, copper (Cu), stainless steel, titanium (Ti), iron (Fe), cobalt (Co), nickel (Ni), or a combination thereof. The negative current collector 21 may comprise an alloy or a coating material of one or more of these metals. The negative current collector 21 may be formed, for example, in the form of a plate, a fiber, a tube, a foil, or a combination thereof.

The negative electrode layer 20 may include lithium metal or a lithium metal alloy. The lithium metal alloy may include lithium metal and a metal or metalloid, or an oxide thereof, alloyable with lithium metal. The metal or metalloid, or the oxide thereof alloyable with lithium metal, may be Si, Sn, Al, Ge, Pb, Bi, Sb, an Si—Y' alloy (where Y' is an alkali metal, an alkaline earth metal, a Group 13 element, a Group 14 element, a transition metal, a rare earth element, or a combination thereof (except for Si)), an Sn—Y' alloy (where Y' is an alkali metal, an alkaline earth metal, a Group 13 element, a Group 14 element, a Group 15 element, a Group 16 element, a transition metal, a rare earth element, or a combination thereof (except for Sn)), MnOx (where 0<x≤2), or the like. The alkali metal may be lithium (Li), sodium (Na), potassium (K), rubidium (Rb), cesium (Cs), or francium (Fr). The alkaline earth metal may be beryllium (Be), magnesium (Mg), calcium (Ca), strontium (Sr), barium (Ba), or radium (Ra). The transition metal may be scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rhodium (Rh) palladium (Pd), silver (Ag), cadmium (Cd), lanthanum (La), hafnium (Hf), tantalum (Ta), tungsten (W), rhenium (Re), osmium (Os), iridium (Ir), platinum (Pt), gold (Au), mercury (Hg), actinium (Ac), rutherfordium (Rf), dubnium (Db), seaborgium (Sg), bohrium (Bh), hassium (Hs), meitnerium (Mt), darmstadtium (Ds), roentgenium (Rg), or copernicium (Cn). The rare earth element may be cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb), or yttrium (Y).

The element Y' may be Mg, Ca, Sr, Ba, Ra, Sc, Y, Ti, Zr, Hf, Rf, V, Nb, Ta, Db, Cr, Mo, W, Sg, Tc, Re, Bh, Fe, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof. For example, the oxide of the metal or metalloid alloyable with lithium metal may be lithium titanium oxide, vanadium oxide, lithium vanadium oxide, $SnO_2$, or $SiO_x$ (where 0<x<2).

The negative electrode layer 20 may further include a protective film on the surface of the lithium metal or lithium metal alloy. The protective film may be, for example, a solid-type protective film. The thickness of the negative electrode layer 20 may be about 100 micrometers (μm) or less, for example, about 80 μm or less, or about 50 μm or less, or about 30 μm or less.

The solid electrolyte layer 30 or the solid electrolyte layer 50 may further include the ion conductor. The solid electrolyte layer 30 may be a single layer. The solid electrolyte 50 may be multiple layers, e.g., two or more layers, that are distinct layers in the solid electrolyte layer. The solid electrolyte layer 30 or the solid electrolyte layer 50 may further include an inorganic solid electrolyte such as $Li_2S$—$P_2S_5$, $Li_2S$—$P_2S_5$—LiX (where X is a halogen), $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (where m and n are positive numbers, respectively, and Z is Ge, Zn, or Ga), $Li_2S$—$GeS_2$, $Li_2S$—$SiS_2$—$Li_3PO_4$, $Li_2S$—$SiS_2$—$Li_pMO_q$ (where p and q are positive numbers, respectively, and M is P, Si, Ge, B, Al, Ga, or In), $Li_xM'_yPS_zA_w$ (x, y, z, and w are numbers from 0 to 6, M' is Ge, Sn, or Si, and A is F, Cl, Br, or I), $Li_{i+x}Ti_{2-x}Al(PO_4)_3$ (LTAP, where 0≤x≤4), $Li_{1-x+y}Al_xTi_{2-x}Si_yP_{3-y}O_{12}$ (where 0<x<2 and 0≤y<3), $BaTiO_3$, $Pb(Zr_aTi_{1-a})O_3$ (where 0≤a≤1) (PZT), $Pb_{1-x}La_xZr_{1-y}Ti_yO_3$ (PLZT, where 0≤x<1 and 0≤y<1), $Pb(Mg_{1/3}Nb_{2/3})O_3$—$PbTiO_3$ (PMN-PT), $HfO_2$, $SrTiO_3$, $SnO_2$, $CeO_2$, $Na_2O$, MgO, NiO, CaO, BaO, ZnO, $ZrO_2$, $Y_2O_3$, $Al_2O_3$, $TiO_2$, $SiO_2$, lithium phosphate ($Li_3PO_4$), lithium titanium phosphate ($Li_xTi_y(PO_4)_3$, where 0<x<2 and 0<y<3), lithium aluminum titanium phosphate ($Li_xAl_yTi_z(PO_4)_3$, where 0<x<2, 0<y<1, and 0<z<3), $Li_{1+x+y}(Al_aGa_{1-a})_x(Ti_bGe_{1-b})_{2-x}Si_yP_{3-y}O_{12}$ (where 0≤x≤1, 0<y<1, 0≤a≤1, and 0≤b≤1), lithium lanthanum titanate ($Li_xLa_yTiO_3$, where 0<x<2 and 0<y<3), $Li_2O$, $LiAlO_2$, $Li_2O$—$Al_2O_3$—$SiO_2$—$P_2O_5$—$TiO_2$—$GeO_2$-based ceramics, Garnet-based ceramics ($Li_{3+x}La_3M_2O_{12}$, where M=Te, Nb, or Zr), or a combination thereof, in addition to the ion conductor.

For example, the solid electrolyte layer 30 or the solid electrolyte layer 50 may further include an inorganic solid electrolyte of $Li_xM'_yPS_zA_w$ (where x, y, z, and w are each independently from 0 to 6, M' is Ge, Sn, or Si, and A is F, Cl, Br, or I). By further including the inorganic solid electrolyte, the solid electrolyte layer may have a high ionic conductivity, e.g., an ionic conductivity that comparable to the ionic conductivity of a liquid electrolyte, which is in the range of about $1\times10^{-2}$ Siemens/centimeter (S/cm) to about $1\times10^{-3}$ S/cm, at room temperature. Thus, an interface having reduced resistance may be formed between the positive electrode layer 10 and the solid electrolyte layer 30 or the solid electrolyte layer 50, and/or between the negative electrode layer 20 and the solid electrolyte layer 30 or the solid electrolyte layer 50, without decreasing ionic conductivity. In addition, the solid electrolyte layer 30 or the solid electrolyte layer 50 may further include an organic solid electrolyte. Examples of the organic solid electrolyte may include a polyethylene derivative, a polyethylene oxide derivative, a polypropylene oxide derivative, a phosphoric acid ester polymer, a poly L-lysine, a polyester sulfide, a polyvinyl alcohol, a polyvinylidene fluoride, or a polymer comprising an ionic dissociable group.

The solid electrolyte layer 30 may be formed as a single layer or the solid electrolyte layer 50 may be formed as multiple layers, e.g., two or more layers. For example, the solid electrolyte layer 30 may be formed as a single layer or the solid electrolyte 50 may be formed as multiple layers 51, 52, and 53, on the ion conductor.

The solid electrolyte layer 30 or the solid electrolyte layer 50 may further include an amorphous solid electrolyte. The solid electrolyte layer 30 or the solid electrolyte layer 50 may include a mixed solid electrolyte in which a crystalline solid electrolyte and an amorphous solid electrolyte are mixed.

The solid electrolyte layer 30 or the solid electrolyte layer 50 may further include a binder. The binder included in the solid electrolyte layer may be styrene butadiene rubber (SBR), polytetrafluoroethylene, polyvinylidene fluoride, polyethylene, polymethacrylate, polyacrylic acid, or a combination thereof.

The solid electrolyte layer 30 or the solid electrolyte layer 50 may have a thickness of about 10 μm to about 150 μm.

The solid electrolyte layer 30 or the solid electrolyte layer 50 may further include an alkali metal salt and/or an ionic liquid. For example, the solid electrolyte layer may further include a lithium metal salt and/or an ionic liquid.

An amount of the lithium salt included in the solid electrolyte layer 30 or the solid electrolyte layer 50 may be about 1 mole per Liter (M) or greater. For example, the amount of the lithium salt included in the solid electrolyte layer may be from about 1 M to about 4 M. When the amount of the lithium salt is within this range, the mobility of lithium ions may further be increased in the solid electrolyte layer, thereby improving ionic conductivity.

The lithium salt may include LiSCN, $LiN(CN)_2$, $Li(CF_3SO_2)_3C$, $LiC_4F_9SO_3$, $LiN(SO_2CF_2CF_3)_2$, LiCl, LiF, LiBr, LiI, $LiB(C_2O_4)_2$, $LiBF_4$, $LiBF_3(C_2F_5)$, lithium bis(oxalato) borate (LiBOB), lithium oxalyldifluoroborate (Li-ODFB), lithium difluoro(oxalato)borate (LiDFOB), lithium bis(trifluoro methanesulfonyl)imide (LiTFSI, $LiN(SO_2CF_3)_2$), lithium bis(fluorosulfonyl)imide (LiFSI, $LiN(SO_2F)_2$), $LiCF_3SO_3$, $LiAsF_6$, $LiSbF_6$, $LiClO_4$, or a combination thereof. For example, the lithium salt may be an imide-based lithium salt. Examples of the imide-based lithium salt may include lithium bis(trifluoro methanesulfonyl)imide (LiTFSI, $LiN(SO_2CF_3)_2$) and lithium bis(fluorosulfonyl)imide (LiFSI, $LiN(SO_2F)_2$). The lithium salt may maintain or improve ionic conductivity by appropriately maintaining chemical reactivity with the ionic liquid.

The ionic liquid may include, for example, $Li_2S$—$P_2S_5$—LiX (where X is a halogen). The halogen can be fluorine, chlorine, bromine, iodine, astatine, tennessine, or a combination thereof.

A weight ratio of the solid electrolyte to the ionic liquid in the solid electrolyte layer 30 or the solid electrolyte layer 50 may be from about 0.1:99.9 to about 90:10. For example, the weight ratio of the solid electrolyte to the ionic liquid may be from about 10:90 to about 90:10. For example, the weight ratio of the solid electrolyte to the ionic liquid may be from about 20:80 to about 90:10. For example, the weight ratio of the solid electrolyte to the ionic liquid may be from about 30:70 to about 90:10. For example, the weight ratio of the solid electrolyte to the ionic liquid may be from about 40:60 to about 90:10. For example, the weight ratio of the solid electrolyte to the ionic liquid may be from about 50:50 to about 90:10. The solid electrolyte layer having a weight ratio of the solid electrolyte to the ionic liquid within these ranges may maintain or improve ionic conductivity by enlarging an electrochemical contact area with an electrode. A battery including the solid electrolyte layer 30 or the solid electrolyte layer 50 may have increased energy density, increased discharge capacity, and/or improved charge rate properties.

The lithium battery, according to an embodiment, may further include a liquid electrolyte, a gel electrolyte, a polymer ionic liquid, or a combination thereof, between the positive electrode layer 10 and the negative current collector 21.

Figure 3:
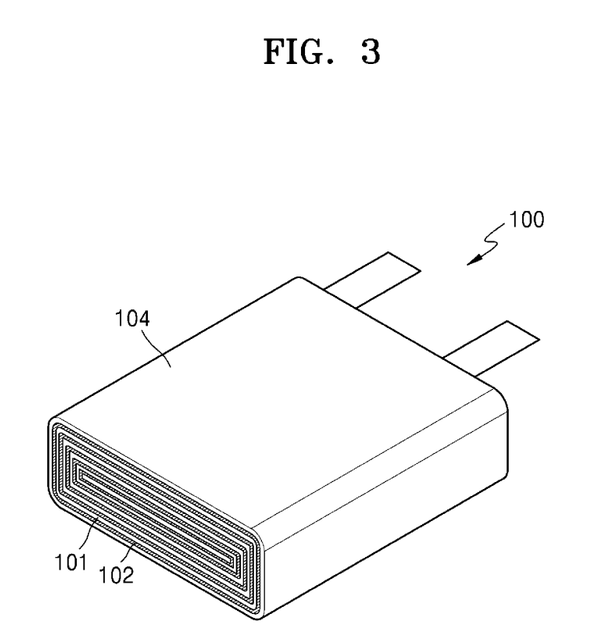
FIG. 3 is a schematic cross-sectional view of an embodiment of a lithium metal battery.

FIG. 3 is a schematic cross-sectional view of a lithium metal battery according to an embodiment.

As shown in FIG. 3, a lithium metal battery 100 includes a positive electrode 101, a negative electrode 102, and a battery can 104, accommodating the positive electrode 101 and the negative electrode 102.

The positive electrode 101 may be the positive electrode layer 10. The positive electrode layer 10 may be formed by coating a positive active material on a surface of a positive current collector formed of aluminum. Alternatively, the positive electrode layer 10 may be formed by casting the positive active material on a separate support and then laminating a positive active material film separated from the support on a current collector.

The negative electrode 102 may be the negative electrode layer 20. The solid electrolyte layer 30 or the solid electrolyte layer 50 may be disposed between the positive electrode 101 and the negative electrode 102.

The lithium metal battery 100 may be formed in a unit cell, wherein the unit cell structure comprises a positive electrode, a separator, and a negative electrode, in a bi-cell, wherein the bi-cell structure comprises a positive electrode, a separator, a negative electrode, a separator, and a positive electrode, or in a stacked battery having a structure in which a unit cell is repeated.

The lithium metal battery 100 may be a primary battery or a secondary battery. For example, the lithium metal battery 100 may be a primary battery.

The lithium battery according to an embodiment may include a lithium-air battery or lithium-sulfur battery in addition to the lithium metal battery 100.

The lithium metal battery 100 may be in the form of a coin, a button, a sheet, a stack, a cylinder, a plane, or a horn. The shape of the lithium metal battery 100 is not particularly limited to the foregoing shapes. Also, the lithium metal battery 100 may be applied to large-sized batteries used in electric vehicles, or the like. For example, the lithium metal battery 100 may be used in hybrid vehicles such as plug-in hybrid electric vehicles (PHEVs). Also, the lithium metal battery 100 may be used in the fields requiring a large amount of power storage. For example, the lithium metal battery may be used in E-bikes and electric tools.

Method of Preparing Ion Conductor

A method of preparing the ion conductor according to an embodiment may include: providing a precursor of the ion conductor to prepare a precursor mixture; pulverizing the precursor mixture; heat-treating the precursor mixture in an oxidizing atmosphere to prepare a first heat-treatment product; pulverizing the first heat-treatment product to prepare a pellet; and heat-treating the pellet in an oxidizing atmosphere, a reducing atmosphere, or a combination thereof.

The precursor of the ion conductor may be a precursor comprising lithium, an element of Group 2, an element of Group 3, an element of Group 4, an element of Group 5, an element of Group 12, an element of Group 13, a halogen, or a combination thereof, which are included in the oxides represented by Formulae 1 to 3. The precursor of the ion conductor may be, for example, $Li_2CO_3$, $M_xO_y$ (where $1 \leq x \leq 2$, $1 \leq y \leq 5$, and M=Zr, Y, Al, Ta, Mg, Zn), LiX (where X=F, Cl, I, Br) but is not limited thereto, and any suitable substance available as a precursor in the art may also be used.

The precursor mixture may be mixed in a stoichiometric ratio and may be subjected to first heat-treatment in an oxidizing atmosphere to prepare the first heat-treatment product. The first heat-treatment may be performed in a temperature range of about 700° C. to about 1000° C. for about 2 hours to about 24 hours.

The first heat-treatment may comprise, for example, heat-treating at about 700° C. to about 1000° C. or about 700° C. to about 900° C. A first heat-treatment time may be from about 2 hours to about 24 hours, from about 4 hours to about 24 hours, from about 6 hours to about 24 hours, or from about 8 hours to about 24 hours.

The first heat-treatment product may be pulverized. Pulverization of the first heat-treatment product may be performed using a dry pulverization method or a wet pulverization method. The wet pulverization may be performed by mixing the first heat-treatment product with a solvent such as methanol, and milling the mixture using a ball mill, or the like, for about 0.5 hours to about 10 hours. The dry pulverization may be performed by milling the first heat-treatment product using a ball mill without using a solvent. A diameter of the pulverized first heat-treatment product may be from about 0.1 μm to about 10 μm or from about 0.1 μm to about 5 μm. The pulverized first heat-treatment product may be dried.

Optionally, the pulverized first heat-treatment product may further be subjected to heat-treatment in a temperature range of about 700° C. to about 1000° C. for about 2 hours to about 24 hours. Crystallinity of the first heat treatment product may further be improved by such an additional heat-treatment. For example, the first heat-treatment product may be completely crystalized. A product obtained after the additional heat-treatment may be pulverized and dried in the same manner as in the first heat-treatment product.

The pulverized first heat-treatment product may be mixed with a binder solution and molded in the form of a pellet or may simply be pressed with a pressure of about 1 ton to about 10 ton into a pellet.

The pellet may be subjected to second heat-treatment in an oxidizing atmosphere, a reducing atmosphere, or a combination thereof.

The second heat-treatment may be performed in an oxidizing atmosphere, in a reducing atmosphere, or in both oxidizing and reducing atmospheres. The oxidizing atmosphere is an atmosphere including an oxidizing gas. The oxidizing gas may be, for example, oxygen or air but is not limited thereto, and any other oxidizing gases available in the art may also be used. The oxidizing atmosphere may be a mixture of an oxidizing gas and an inert gas. The inert gas used herein may be the same as that used in the reducing atmosphere. The reducing atmosphere is an atmosphere including a reducing gas. The reducing gas may be, for example, hydrogen ($H_2$) but is not limited thereto, and any other reducing gases available in the art may also be used. The reducing atmosphere may be a mixture of a reducing gas and an inert gas. The inert gas may be, for example, nitrogen or argon but is not limited thereto, and any other inert gases available in the art may also be used. An amount of the reducing gas in the reducing atmosphere may be, for example, from about 1% to about 99%, from about 2% to about 50%, or from about 5% to about 20%, based on a total amount of gases. The second heat-treatment performed in both oxidizing and reducing atmospheres refers to second heat-treatment including heat-treatments sequentially performed in an oxidizing atmosphere and then in a reducing atmosphere. The oxidizing atmosphere and the reducing atmosphere are the same as the oxidizing atmosphere and reducing atmosphere used in the first heat-treatment.

The second heat-treatment may be performed, for example, at a temperature of about 800° C. to about 1300° C. or about 900° C. to about 1200° C. A second heat-treatment time may be, for example, from about 1 hour to about 24 hours, from about 3 hours to about 24 hours, from about 5 hours to about 24 hours, or from about 3 hours to about 24 hours. When the first heat-treatment and the second heat-treatment are performed under such conditions, crystallinity of the prepared ion conductor is improved, and electrochemical stability thereof is further improved.

Hereinafter, one or more example embodiments of the present disclosure will be described in detail with reference to the following examples and comparative examples. These examples and comparative examples are not intended to limit the purpose and scope of the embodiments of the present disclosure.

EXAMPLES

Preparation of Ion Conductor

Example 1: Preparation of $Li_{4.2}Zr_{0.8}Y_{0.2}O_4$ $Li_2CO_3$ as a lithium precursor, $ZrO_2$ as a zirconium precursor, and $Y_2O_3$ powder as a yttrium precursor were added to ethanol in a stoichiometric ratio, and then pulverized and mixed using a ball mill with zirconia (YSZ) balls having a diameter of 12 millimeters (mm) at 300 rotations per minute (rpm) for 4 hours to prepare a mixture. The mixture was dried at room temperature, heated to 800° C. at a heating rate of about 5 degrees Celsius per minute (° C./min), and subjected to first heat-treatment at 800° C. in air for 24 hours. A first heat-treatment product was pulverized and pressed to prepare a cylindrical pellet having a diameter of about 1 cm and a height of about 0.5 cm. The pellet was heated to 900° C. at a heating rate of about 5° C./min and subjected to second heat-treatment at 900° C. in an air atmosphere for about 24 hours to prepare an ion conductor. The prepared ion conductor had a composition of $Li_{4.2}Zr_{0.8}Y_{0.2}O_4$.

Example 2: Preparation of $Li_{3.8}Zr_{0.8}Ta_{0.2}O_4$

An ion conductor was prepared in the same manner as in Example 1, except that the stoichiometric mixing ratio of the starting materials was modified and $Ta_2O_5$ powder as a tantalum precursor was used instead of the yttrium precursor of $Y_2O_3$ to prepare $Li_{3.8}Zr_{0.8}Ta_{0.2}O_4$.

Example 3: Preparation of $Li_{3.9}ZrF_{0.1}O_{3.9}$

An ion conductor was prepared in the same manner as in Example 1, except that the stoichiometric mixing ratio of the starting materials was modified and LiF powder as a fluorine precursor was used instead of the yttrium precursor of $Y_2O_3$ to prepare $Li_{3.9}ZrF_{0.1}O_{3.9}$.

Example 4: Preparation of $Li_{3.8}ZrF_{0.2}O_{3.8}$

An ion conductor was prepared in the same manner as in Example 1, except that the stoichiometric mixing ratio of the starting materials was modified and LiF powder as a fluorine precursor was used instead of the yttrium precursor of $Y_2O_3$ to prepare $Li_{3.9}ZrF_{0.2}O_{3.8}$.

Example 5: Preparation of $Li_{3.5}ZrF_{0.5}O_{3.5}$

An ion conductor was prepared in the same manner as in Example 1, except that the stoichiometric mixing ratio of the starting materials was modified and LiF powder as a fluorine precursor was used instead of the yttrium precursor of $Y_2O_3$ to prepare $Li_{3.5}ZrF_{0.5}O_{3.5}$.

Example 6: Preparation of $Li_{3.9}ZrCl_{0.1}O_{3.9}$

An ion conductor was prepared in the same manner as in Example 1, except that the stoichiometric mixing ratio of the starting materials was modified and LiCl powder as a chlorine precursor was used instead of the yttrium precursor of $Y_2O_3$ to prepare $Li_{3.9}ZrCl_{0.1}O_{3.9}$.

Example 7: Preparation of $Li_{3.8}ZrCl_{0.2}O_{3.8}$

An ion conductor was prepared in the same manner as in Example 1, except that the stoichiometric mixing ratio of the starting materials was modified and LiCl powder as a chlorine precursor was used instead of the yttrium precursor of $Y_2O_3$ to prepare $Li_{3.8}ZrCl_{0.2}O_{3.8}$.

Example 8: Preparation of $Li_{3.5}ZrCl_{0.5}O_{3.5}$

An ion conductor was prepared in the same manner as in Example 1, except that the stoichiometric mixing ratio of the starting materials was modified and LiCl powder as a chlorine precursor was used instead of the yttrium precursor of $Y_2O_3$ to prepare $Li_{3.5}ZrCl_{0.5}O_{3.5}$.

Example 9: Preparation of $Li_4HfO_4$

An ion conductor was prepared in the same manner as in Example 1, except that the stoichiometric mixing ratio of the starting materials was modified and $HfO_2$ powder as a hafnium precursor was used instead of the zirconium precursor of $ZrO_2$ and the yttrium precursor of $Y_2O_3$ to prepare $Li_4HfO_4$.

Example 10: Preparation of $Li_{4.2}Hf_{0.8}Y_{0.2}O_4$

An ion conductor was prepared in the same manner as in Example 1, except that the stoichiometric mixing ratio of the starting materials was modified and $HfO_2$ powder as a hafnium precursor was used instead of the zirconium precursor of $ZrO_2$ to prepare $Li_{4.2}Hf_{0.8}Y_{0.2}O_4$.

Example 11: Preparation of $Li_{4.2}Hf_{0.8}Al_{0.2}O_4$

An ion conductor was prepared in the same manner as in Example 1, except that the stoichiometric mixing ratio of the starting materials was modified and $HfO_2$ powder as a hafnium precursor and $Al_2O_3$ powder as an aluminum precursor were used instead of the zirconium precursor of $ZrO_2$ and the yttrium precursor of $Y_2O_3$ to prepare $Li_{4.2}Hf_{0.8}Al_{0.2}O_4$.

Example 12: Preparation of $Li_{4.2}Hf_{0.8}Ta_{0.2}O_4$

An ion conductor was prepared in the same manner as in Example 1, except that the stoichiometric mixing ratio of the starting materials was modified and $HfO_2$ powder as a hafnium precursor and $Ta_2O_5$ powder as a tantalum precursor were used instead of the zirconium precursor of $ZrO_2$ and the yttrium precursor of $Y_2O_3$ to prepare $Li_{4.2}Hf_{0.8}Ta_{0.2}O_4$.

Example 13: Preparation of $Li_{4.2}Hf_{0.9}Mg_{0.1}O_4$

An ion conductor was prepared in the same manner as in Example 1, except that the stoichiometric mixing ratio of the starting materials was modified and $HfO_2$ powder as a hafnium precursor and MgO powder as a magnesium precursor were used instead of the zirconium precursor of $ZrO_2$ and the yttrium precursor of $Y_2O_3$ to prepare $Li_{4.2}Hf_{0.9}Mg_{0.1}O_4$.

Example 14: Preparation of $Li_{4.2}Hf_{0.9}Zn_{0.1}O_4$

An ion conductor was prepared in the same manner as in Example 1, except that the stoichiometric mixing ratio of the starting materials was modified and $HfO_2$ powder as a hafnium precursor and ZnO powder as a zinc precursor were used instead of the zirconium precursor of $ZrO_2$ and the yttrium precursor of $Y_2O_3$ to prepare $Li_{4.2}Hf_{0.9}Zn_{0.1}O_4$.

Example 15: Preparation of $Li_{3.9}HfF_{0.1}O_{3.9}$

An ion conductor was prepared in the same manner as in Example 1, except that the stoichiometric mixing ratio of the starting materials was modified and $HfO_2$ powder as a hafnium precursor and LiF powder as a fluorine precursor were used instead of the zirconium precursor of $ZrO_2$ and the yttrium precursor of $Y_2O_3$ to prepare $Li_{3.9}HfF_{0.1}O_{3.9}$.

Example 16: Preparation of $Li_{3.8}HfF_{0.2}O_{3.8}$

An ion conductor was prepared in the same manner as in Example 1, except that the stoichiometric mixing ratio of the starting materials was modified and $HfO_2$ powder as a hafnium precursor and LiF powder as a fluorine precursor were used instead of the zirconium precursor of $ZrO_2$ and the yttrium precursor of $Y_2O_3$ to prepare $Li_{3.8}HfF_{0.2}O_{3.8}$.

Example 17: Preparation of $Li_{3.5}HfF_{0.5}O_{3.5}$

An ion conductor was prepared in the same manner as in Example 1, except that the stoichiometric mixing ratio of the starting materials was modified and $HfO_2$ powder as a hafnium precursor and LiF powder as a fluorine precursor were used instead of the zirconium precursor of $ZrO_2$ and the yttrium precursor of $Y_2O_3$ to prepare $Li_{3.5}HfF_{0.5}O_{3.5}$.

Example 18: Preparation of $Li_{3.9}HfCl_{0.1}O_{3.9}$

An ion conductor was prepared in the same manner as in Example 1, except that the stoichiometric mixing ratio of the starting materials was modified and $HfO_2$ powder as a hafnium precursor and LiCl powder as a chlorine precursor were used instead of the zirconium precursor of $ZrO_2$ and the yttrium precursor of $Y_2O_3$ to prepare $Li_{3.9}HfCl_{0.1}O_{3.9}$.

Example 19: Preparation of $Li_{3.8}HfCl_{0.2}O_{3.8}$

An ion conductor was prepared in the same manner as in Example 1, except that the stoichiometric mixing ratio of the starting materials was modified and HfO$_2$ powder as a hafnium precursor and LiCl powder as a chlorine precursor were used instead of the zirconium precursor of ZrO$_2$ and the yttrium precursor of Y$_2$O$_3$ to prepare Li$_{3.8}$HfCl$_{0.2}$O$_{3.8}$.

Example 20: Preparation of Li$_{3.5}$HfCl$_{0.5}$O$_{3.5}$

An ion conductor was prepared in the same manner as in Example 1, except that the stoichiometric mixing ratio of the starting materials was modified and HfO$_2$ powder as a hafnium precursor and LiCl powder as a chlorine precursor were used instead of the zirconium precursor of ZrO$_2$ and the yttrium precursor of Y$_2$O$_3$ to prepare Li$_{3.5}$HfCl$_{0.5}$O$_{3.5}$.

Example 21: Preparation of Li$_{4.4}$Hf$_{0.9}$O$_4$

An ion conductor was prepared in the same manner as in Example 1, except that the stoichiometric mixing ratio of the starting materials was modified and HfO$_2$ powder as a hafnium precursor was used instead of the zirconium precursor of ZrO$_2$ and the yttrium precursor of Y$_2$O$_3$ to prepare Li$_{4.4}$Hf$_{0.9}$O$_4$.

Example 22: Preparation of Li$_{4.4}$Zr$_{0.9}$O$_4$

An ion conductor was prepared in the same manner as in Example 1, except that the stoichiometric mixing ratio of the starting materials was modified and the yttrium precursor of Y$_2$O$_3$ powder was not used to prepare Li$_{4.4}$Zr$_{0.9}$O$_4$.

Comparative Example 1: Preparation of Li$_4$ZrO$_4$

An ion conductor was prepared in the same manner as in Example 1, except that the stoichiometric mixing ratio of the starting materials was modified and the yttrium precursor of Y$_2$O$_3$ was not used to prepare Li$_4$ZrO$_4$.

Comparative Example 2: Preparation of Li$_{4.2}$Zr$_{0.9}$Mg$_{0.1}$O$_4$

An ion conductor was prepared in the same manner as in Example 1, except that the stoichiometric mixing ratio of the starting materials was modified and MgO powder as a magnesium precursor was used instead of the yttrium precursor of Y$_2$O$_3$ to prepare Li$_{4.2}$Zr$_{0.9}$Mg$_{0.1}$O$_4$.

Evaluation Example 1: Evaluation of Ionic Conductivity

The top and bottom surface of a pellet of each of the ion conductors prepared according to Examples 1 to 22 and Comparative Examples 1 and 2 were coated with gold (Au) paste by deposition to prepare a sample and impedance of the sample was measured using a 2-probe method using an impedance analyzer (Material Mates 7260 impedance analyzer). A frequency of 0.1 hertz (Hz) to 1 megahertz (MHz) and an amplitude voltage of 100 mV were used. The measurement was performed in air at 60° C. Resistance was calculated from an arc of a Nyquist plot with respect to measurements of impedance, and ionic conductivity was calculated therefrom. The results are shown in FIG. 4 and Table 1.

TABLE 1

| Example | ionic conductivity (mS/cm, @ 60° C.) |
|---|---|
| Example 1 | 1.01 × 10$^{-6}$ |
| Example 2 | 9.05 × 10$^{-7}$ |
| Example 3 | 1.54 × 10$^{-6}$ |
| Example 4 | 7.72 × 10$^{-7}$ |
| Example 5 | 9.12 × 10$^{-7}$ |
| Example 6 | 8.22 × 10$^{-7}$ |
| Example 7 | 8.51 × 10$^{-7}$ |
| Example 8 | 4.61 × 10$^{-7}$ |
| Example 9 | 5.30 × 10$^{-7}$ |
| Example 10 | 4.72 × 10$^{-7}$ |
| Example 11 | 1.28 × 10$^{-6}$ |
| Example 12 | 2.27 × 10$^{-6}$ |
| Example 13 | 6.13 × 10$^{-7}$ |
| Example 14 | 8.15 × 10$^{-7}$ |
| Example 15 | 6.23 × 10$^{-7}$ |
| Example 16 | 5.72 × 10$^{-7}$ |
| Example 17 | 4.89 × 10$^{-7}$ |
| Example 18 | 5.34 × 10$^{-7}$ |
| Example 19 | 5.60 × 10$^{-7}$ |
| Example 20 | 3.79 × 10$^{-7}$ |
| Example 21 | 7.02 × 10$^{-7}$ |
| Example 22 | 1.14 × 10$^{-6}$ |
| Comparative Example 1 | 9.36 × 10$^{-8}$ |
| Comparative Example 2 | 1.89 × 10$^{-7}$ |

Figure 4:
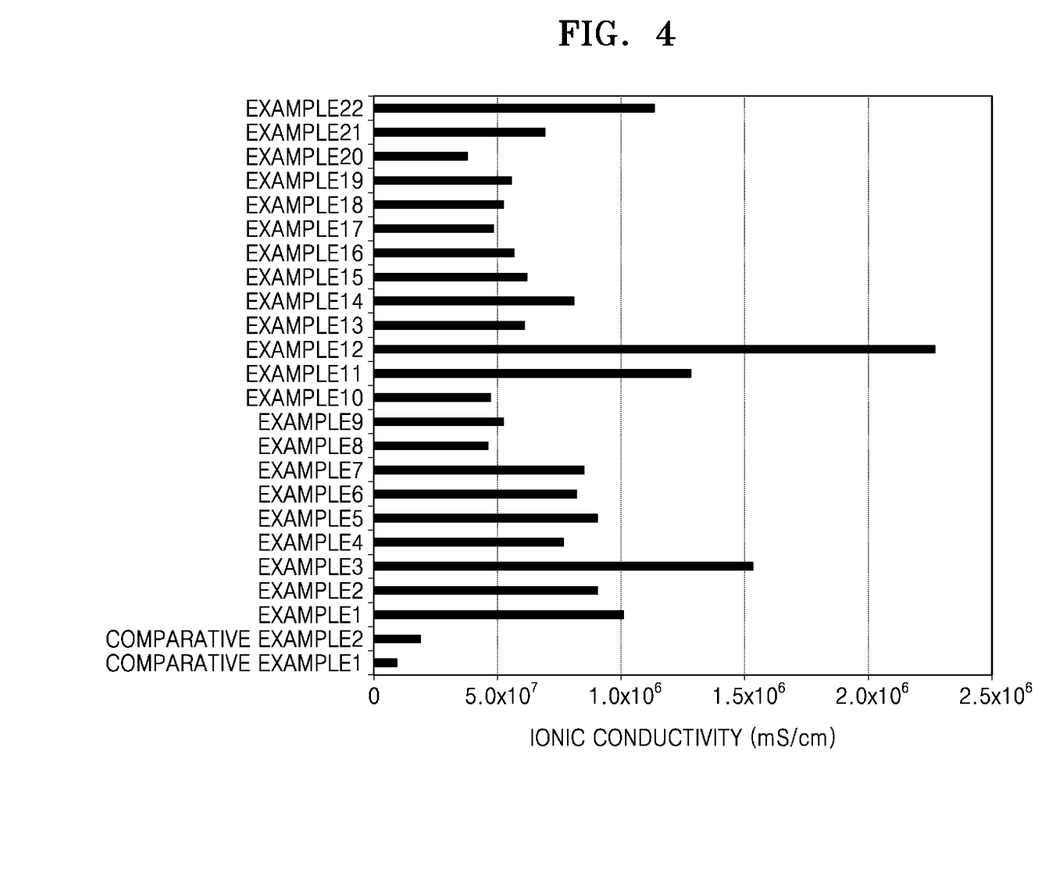
FIG. 4 is a bar graph showing the ionic conductivity (Siemens per centimeter, S/cm) at 60° C. of the ion conductor prepared according to Examples 1 to 22 and Comparative Examples 1 and 2.

Referring to FIG. 4 and Table 1, the ion conductors prepared according to Examples 1 to 22 exhibited higher ionic conductivities than those of the ion conductors prepared according to Comparative Examples 1 and 2.

The ion conductor according to an embodiment may have a high ionic conductivity at a high temperature by reducing the activation barrier energy for movement of lithium ions when compared with Li$_4$ZrO$_4$.

It should be understood that embodiments described herein should be considered in a descriptive sense only and not for purposes of limitation. Descriptions of features or aspects within each embodiment should be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A lithium battery comprising:
a positive electrode comprising a positive active material;
a negative electrode comprising lithium metal; and
a solid electrolyte disposed between the positive electrode and the negative electrode,
wherein the solid electrolyte comprises at least one oxide represented by Formulae 1 to 3

Formula 1 wherein in Formula 1,
0≤x≤1 and 0≤x'≤1,
M is a Group 4 element, and
M' is an element of Group 2, an element of Group 3, an element of Group 5, an element of Group 12, an element of Group 13, a vacancy, or a combination thereof,
with the proviso that when M is Zr or Ti, then x≠0, x'≠0 and M' is Be, Ca, Sr, Ba, Ra, Cd, Hg, Cn, Ga, IN, TI, an element of Group 3, an element of Group 5, or a combination thereof;

Formula 2 wherein in Formula 2,
$0 \leq y \leq 1$,
M" is a Group 4 element, and
A' includes at least one halogen,
with the proviso that when M" is Zr or Ti, then $y \neq 0$;

$$Li_{4+4z}M'''_{1-z}O_4 \quad \text{Formula 3}$$

wherein in Formula 3,
$0 < z < 1$, and
M''' is a Group 4 element.

2. The lithium battery of claim 1, wherein any of M, M", and M''' are Zr, Hf, or a combination thereof.

3. The lithium battery of claim 1, wherein M' is Y, Al, Ta, Mg, Zn, or a combination thereof.

4. The lithium battery of claim 1, wherein x and x' are each independently from 0 to about 0.5.

5. The lithium battery of claim 1, wherein x and x' are each independently from greater than 0 to about 0.5.

6. The lithium battery of claim 1, wherein y is from 0 to about 0.5.

7. The lithium battery of claim 1, wherein y is from greater than 0 to about 0.5.

8. The lithium battery of claim 1, wherein z is from 0 to about 0.5.

9. The lithium battery of claim 1, wherein z is from greater than 0 to about 0.5.

10. The lithium battery of claim 1, wherein the oxide is $Li_{4.2}Zr_{0.8}Y_{0.2}O_4$, $Li_{3.8}Zr_{0.8}Ta_{0.2}O_4$, $Li_{3.9}ZrF_{0.1}O_{3.9}$, $Li_{3.8}ZrF_{0.2}O_{3.8}$, $Li_{3.5}ZrF_{0.5}O_{3.5}$, $Li_{3.9}ZrCl_{0.1}O_{3.9}$, $Li_{3.8}ZrCl_{0.2}O_{3.8}$, $Li_{3.5}ZrCl_{0.5}O_{3.5}$, $Li_4HfO_4$, $Li_{4.2}Hf_{0.8}Y_{0.2}O_4$, $Li_{4.2}Hf_{0.8}Al_{0.2}O_4$, $Li_{3.8}Hf_{0.8}Ta_{0.2}O_4$, $Li_{4.2}Hf_{0.9}Mg_{0.1}O_4$, $Li_{4.2}Hf_{0.9}Zn_{0.1}O_4$, $Li_{3.9}HfF_{0.1}O_{3.9}$, $Li_{3.8}HfF_{0.2}O_{3.8}$, $Li_{3.5}HfF_{0.5}O_{3.5}$, $Li_{3.9}HfCl_{0.1}O_{3.9}$, $Li_{3.8}HfCl_{0.2}O_{3.8}$, $Li_{3.5}HfCl_{0.5}O_{3.5}$, $Li_{4.4}Zr_{0.9}O_4$, $Li_{4.4}Hf_{0.9}O_4$, or a combination thereof.

11. The lithium battery of claim 1, wherein the oxide has an ionic conductivity of about $2 \times 10^{-7}$ mS/cm or more at about 60° C.

12. The lithium battery of claim 1, wherein the oxide is a solid ion conductor.

13. The lithium battery of claim 1, wherein the solid electrolyte further comprises $Li_2S$—$P_2S_5$, $Li_2S$—$P_2S_5$—LiX wherein X is a halogen, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ wherein m and n are positive numbers, respectively, and Z is Ge, Zn, or Ga, $Li_2S$—$GeS_2$, $Li_2S$—$SiS_2$—$Li_3PO_4$, $Li_2S$—$SiS_2$—$Li_pMO_q$ wherein p and q are positive numbers, respectively, and M is P, Si, Ge, B, Al, Ga, or In, $Li_xM'_yPS_zA_w$ wherein x, y, z, and w are from 0 to 6, M' is Ge, Sn, or Si, and A is F, Cl, Br, or I, $Li_{1+x}Ti_{2-x}Al(PO_4)_3$ wherein $0 \leq x \leq 4$, $Li_{1+x+y}Al_xTi_{2-x}Si_yP_{3-y}O_{12}$ wherein $0 < x < 2$ and $0 \leq y < 3$, $BaTiO_3$, $Pb(Zr_aTi_{1-a})O_3$ wherein $0 \leq a \leq 1$, $Pb_{1-x}La_xZr_{1-y}Ti_yO_3$ wherein $0 \leq x < 1$ and $0 \leq y < 1$, $Pb(Mg_{1/3}Nb_{2/3})O_3$—$PbTiO_3$, $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $Li_3PO_4$, $Li_xTi_y(PO_4)_3$ wherein $0 < x < 2$ and $0 < y < 3$, $Li_xAl_yTi_z(PO_4)_3$ wherein $0 < x < 2$, $0 < y < 1$, and $0 < z < 3$, $Li_{1+x+y}(Al_aGa_{1-a})_x(Ti_bGe_{1-b})_{2-x}Si_yP_{3-y}O_{12}$ wherein $0 \leq x \leq 1$, $0 \leq y \leq 1$, $0 \leq a \leq 1$, and $0 \leq b \leq 1$, $Li_xLa_yTiO_3$ wherein $0 < x < 2$ and $0 < y < 3$, $Li_2O$, $LiAlO_2$, a $Li_2O$—$Al_2O_3$—$SiO_2$—$P_2O_5$—$TiO_2$—$GeO_2$ ceramic, a $Li_{3+x}La_3M_2O_{12}$ ceramic wherein M is Te, Nb, or Zr, or a combination thereof.

14. The lithium battery of claim 1, wherein the solid electrolyte is in a form of a single layer or multiple layers.

15. The lithium battery of claim 1, wherein the lithium battery is a lithium metal battery, a lithium-air battery, or a lithium-sulfur battery.

16. The lithium battery of claim 1, wherein in Formula 1, $0 < x' < 1$.

17. The lithium battery of claim 1, wherein in Formula 2, $0 < y \leq 1$.

* * * * *